(12) United States Patent
Banno

(10) Patent No.: US 10,474,405 B2
(45) Date of Patent: Nov. 12, 2019

(54) CONTROLLER, SERVER, AND STORAGE MEDIUM

(71) Applicant: Brother Kogyo Kabushiki Kaisha, Nagoya-shi, Aichi-ken (JP)

(72) Inventor: Hirokazu Banno, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 16/135,106

(22) Filed: Sep. 19, 2018

(65) Prior Publication Data

US 2019/0102128 A1 Apr. 4, 2019

(30) Foreign Application Priority Data

Sep. 29, 2017 (JP) ................. 2017-190318

(51) Int. Cl.
  *G06F 3/12* (2006.01)
  *G06Q 30/06* (2012.01)
  *G06Q 10/08* (2012.01)

(52) U.S. Cl.
  CPC ....... *G06F 3/1287* (2013.01); *G06Q 30/0635* (2013.01); *G06F 3/1204* (2013.01); *G06F 3/1293* (2013.01); *G06Q 10/087* (2013.01)

(58) Field of Classification Search
  CPC .... G06F 3/1287; G06F 3/1204; G06F 3/1293; G06Q 30/0635; G06Q 10/087
  See application file for complete search history.

(56) References Cited

U.S. PATENT DOCUMENTS

| 9,904,881 B2 | 2/2018 | Miyazawa | |
| 2009/0112738 A1* | 4/2009 | Nagata | B41J 2/17559 705/28 |
| 2013/0028616 A1* | 1/2013 | Kunihiro | G06F 3/1204 399/27 |
| 2017/0061268 A1 | 3/2017 | Miyazawa | |

FOREIGN PATENT DOCUMENTS

| JP | 2009-208440 A | 9/2009 |
| JP | 2014-148079 A | 8/2014 |
| JP | 2017-047537 A | 3/2017 |

\* cited by examiner

*Primary Examiner* — Iriana Cruz
(74) *Attorney, Agent, or Firm* — Banner & Witcoff, Ltd.

(57) ABSTRACT

A controller configured to perform: receiving first type consumable product information from a first type consumable product in a state where the first type consumable product is mounted to a printing execution apparatus; displaying a selection screen in a case where a registering instruction for registering ordering-related information is received, the selection screen including a first type information indicating the first type consumable product and being displayed in a first display mode and another type information indicating another consumable product different from the first type consumable product and being displayed in a second display mode; and registering the ordering-related information in a case where one piece of type information is selected from the plurality of pieces of type information included in the selection screen, the registered ordering-related information including consumable product information specifying a consumable product indicated by the one piece of type information.

8 Claims, 10 Drawing Sheets

FIG. 2

USER TABLE 30

USER INFORMATION

| USER NAME | PASSWORD | PIN CODE |
|---|---|---|
| UN | P | — |
| .. | .. | .. |

DEVICE TABLE 32

DEVICE INFORMATION

| USER NAME | SERIAL NUMBER | MODEL NAME | ACCESS TOKEN |
|---|---|---|---|
| UN | SN1 | MN | AT1 |
| .. | .. | .. | .. |

32a →

TARGET CARTRIDGE TABLE 34

| MODEL NAME | Black | Cyan | Magenta | Yellow |
|---|---|---|---|---|
| MN | BK001, BK010, BK100 | C001, C010 | M001, M010 | Y001, Y010 |
| .. | .. | .. | .. | .. |

MOUNTED CARTRIDGE TABLE 36

MOUNTED CARTRIDGE INFORMATION

| SERIAL NUMBER | Black | Cyan | Magenta | Yellow |
|---|---|---|---|---|
| SN1 | BK001-OFF | C001-OFF | M001-OFF | Y001-ON |
| .. | .. | .. | .. | .. |

NON-TARGET FLAG

36a →

SHIPMENT CARTRIDGE TABLE 38

SHIPMENT CARTRIDGE INFORMATION

| SERIAL NUMBER | USE FLAG | Black | Cyan | Magenta | Yellow |
|---|---|---|---|---|---|
| SN1 | ON | BK001 | C001 | M001 | Y001 |
| .. | .. | .. | .. | .. | .. |

38a →

CONTROLLER, SERVER, AND STORAGE MEDIUM

CROSS-REFERENCE TO RELATED APPLICATIONS

This application claims priority from Japanese Patent Application No. 2017-190318 filed on Sep. 29, 2017, the entire contents of which are incorporated herein by reference.

TECHNICAL FIELD

The present disclosure relates to a controller configured to execute processing related to a printing execution apparatus, a server including the controller, and a non-transitory computer readable storage medium storing a program which is executed by a computer of a controller to execute processing related to a printing execution apparatus.

BACKGROUND

Related art discloses a server configured to provide an ordering service of a cartridge that is to be mounted to a printer. A user selects a cartridge, which is an ordering target, from a plurality of types of cartridges (for example, a cartridge having large-capacity ink accommodated therein, a cartridge having standard-capacity ink accommodated therein, and the like) when starting to use the service. Thereby, the server stores information specifying the selected cartridge, and the selected cartridge is ordered by using the information.

In order to use the above-described service, the user needs to select a cartridge, which is an ordering target, from the plurality of types of cartridges.

SUMMARY

The present disclosure is to provide a technology by which a user can easily select type information indicative of a consumable product, which is to be mounted to a printing execution apparatus, from a plurality of pieces of type information indicative of a plurality of types of consumable products in a situation where the user is to register ordering-related information which relates to an ordering of the consumable product to be mounted to the printing execution apparatus.

According to an aspect of the disclosure, there is provided a controller configured to perform: receiving first type consumable product information from a first type consumable product in a state where the first type consumable product is mounted to a printing execution apparatus, the first type consumable product information specifying the first type consumable product; receiving a registering instruction, the registering instruction being for registering ordering-related information, the ordering-related information being related to an ordering of a consumable product to be mounted to the printing apparatus; displaying a selection screen on a display in a case where the registering instruction is received, the selection screen including a plurality of pieces of type information indicative of a plurality of types of consumable products capable of being mounted to the printing execution apparatus, the plurality of pieces of type information including a first type information and another type information, the first type information indicating the first type consumable product specified by the received first type consumable product information and being displayed in a first display mode in the selection screen, and the other type information indicating another consumable product different from the first type consumable product and being displayed in a second display mode different from the first display mode in the selection screen; and registering the ordering-related information in a memory in a case where one piece of type information is selected from the plurality of pieces of type information included in the selection screen, the registered ordering-related information including selected consumable product information specifying a selected consumable product, and the selected consumable product being indicated by the one piece of type information.

According to the above configuration, the controller is configured to display, on the display, the selection screen in which the first type information indicative of the first type consumable product mounted to the printing execution apparatus and the each type information indicative of the each consumable product different from the first type consumable product are displayed in different modes. For this reason, the user can distinguishingly recognize the first type information and the other type information. Accordingly, in a case where the user wants to place an order for the first type consumable product actually mounted to the printing execution apparatus, for example, the user can easily select the first type information. Also, for example, in a case where the user wants to place an order for a consumable product other than the first type consumable product, the user can easily select the piece of type information different from the first type information. In this way, in the situation where the user is to register the ordering-related information related to the ordering of the consumable product, the user can easily select the piece of type information indicative of the consumable product, which is to be mounted to the printing execution apparatus, from the plurality of pieces of type information indicative of the plurality of types of consumable products.

A control method, a computer program, a computer readable storage medium having the computer program stored therein for implementing the controller are also novel and useful.

Figure 1:
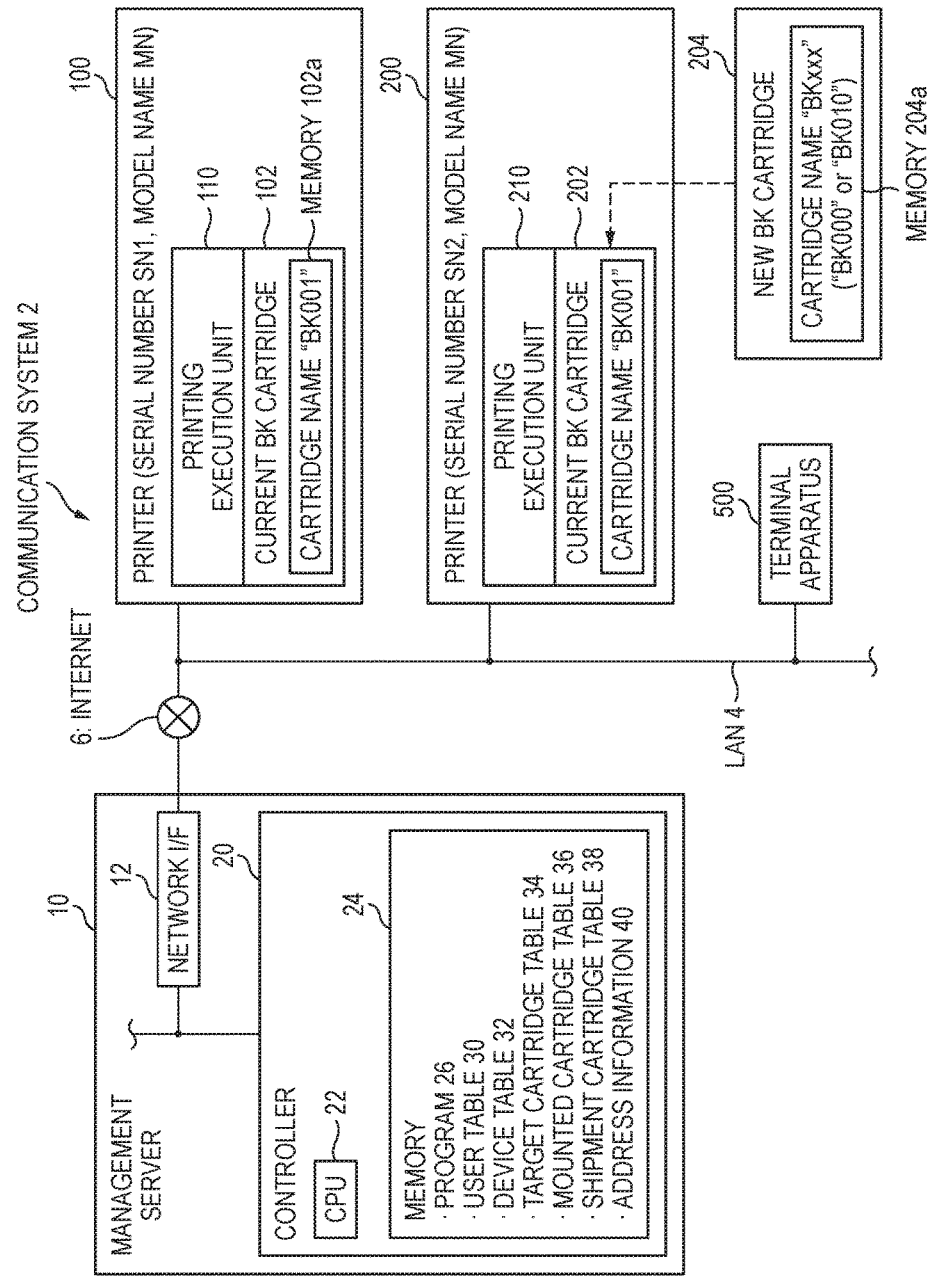
FIG. 1 depicts a configuration of a communication system.

DETAILED DESCRIPTION (Configuration of Communication System 2; FIG. 1)

As shown in FIG. 1, a communication system 2 includes a management server 10, a plurality of printers 100, 200, and a terminal apparatus 500. The terminal apparatus 500 is a user terminal such as a desktop PC (abbreviation of Personal Computer), a notebook, a portable terminal and the like. The printers 100, 200 and the terminal apparatus 500 are connected to the same LAN (abbreviation of Local Area Network) 4. The LAN 4 may be a wired LAN or a wireless LAN. Also, the LAN 4 is connected to the Internet 6. An apparatus (for example, the printer 100) belonging to the LAN 4 can perform communication with a server (for example, the management server 10) provided on the Internet 6, through the LAN 4 and the Internet 6.

(Configurations of Printers 100, 200)

The printer 100 is a peripheral apparatus (i.e., a peripheral apparatus of the terminal apparatus 500) capable of executing a printing function. The printer 100 is allotted with a serial number SN1 and a model name MN. The serial number SN1 is a unique character string that is provided to each printer when manufacturing a plurality of printers having the model name MN.

The printer 100 includes a printing execution unit 110. The printing execution unit 110 is an inkjet printing mechanism. The printing execution unit 110 is currently mounted with a BK cartridge 102, which is an ink cartridge configured to accommodate therein black ink. The printing execution unit 110 is configured to execute a printing by using the black ink accommodated in the BK cartridge 102. In the meantime, although the printing execution unit 110 is mounted with ink cartridges configured to accommodate therein inks of colors (for example, cyan, magenta, yellow and the like) other than black as well, the descriptions thereof are omitted in the illustrative embodiment and the black cartridge will be mainly described. On the other hand, in a modified embodiment, the printing execution unit 110 may be a laser printing mechanism. In this case, the BK cartridge 102 is a toner cartridge configured to accommodate therein black toner.

The printing execution unit 110 is mounted with any one of a plurality of types of cartridges configured to accommodate therein the black ink. The plurality of types of cartridges includes a cartridge configured to accommodate therein small-capacity ink and a cartridge configured to accommodate therein standard-capacity ink, and a cartridge configured to accommodate therein large-capacity ink. The BK cartridge 102 is a cartridge configured to accommodate therein standard-capacity ink, and has a cartridge name "BK001". The BK cartridge 102 includes a memory 102a in which the cartridge name "BK001" is stored. In the case that the BK cartridge 102 is mounted, the printing execution unit 110 reads out the cartridge name "BK001" from the memory 102a of the BK cartridge 102.

The printer 200 has a similar configuration to the printer 100. The printer 200 is allotted with a serial number SN2 and the model name MN. A printing execution unit 210 of the printer 200 is currently mounted with a BK cartridge 202 having a cartridge name "BK001". The user mounts a BK cartridge 204 having a cartridge name "BKxxx" different from the cartridge name "BK001" to the printing execution unit 210, instead of the BK cartridge 202. The BK cartridge 204 has a memory 204a in which the cartridge name "BKxxx" is stored. The cartridge name "BKxxx" is a cartridge name "BK000" or "BK010". The cartridge name "BK000" indicates a cartridge configured to accommodate therein small-capacity black ink. The cartridge name "BK010" indicates a cartridge configured to accommodate therein large-capacity black ink.

(Configuration of Management Server 10)

The management server 10 is configured to collect and manage information related to the printers (for example, the printer 100), and to provide a shipment service of shipping a cartridge to the user of the printer by using the information. The management server 10 is provided on the Internet 6 by vendors of the printers 100, 200. On the other hand, in a modified embodiment, the management server 10 may be provided by a business operator different from the vendors.

The management server 10 includes a network interface 12 and a controller 20. The network interface 12 is connected to the Internet 6. Hereinafter, the interface is referred to as "I/F".

The controller 20 includes a CPU 22 and a memory 24. The CPU 22 is configured to execute a variety of processing, in accordance with a program 26 stored in the memory 24. The memory 24 is configured by a volatile memory, a non-volatile memory, and the like. In the memory 24, a user table 30, a device table 32, a target cartridge table 34, a mounted cartridge table 36, a shipment cartridge table 38, and address information 40 are stored. The management server 10 provides a shipment service of shipping a cartridge to an address indicated by the address information 40 in a case where a predetermined condition is satisfied. The predetermined condition includes a condition that a predetermined date of one month comes, a condition that a remaining amount of ink in a cartridge mounted to the printer is equal to or smaller than a threshold value, and the like, for example.

Figure 2:
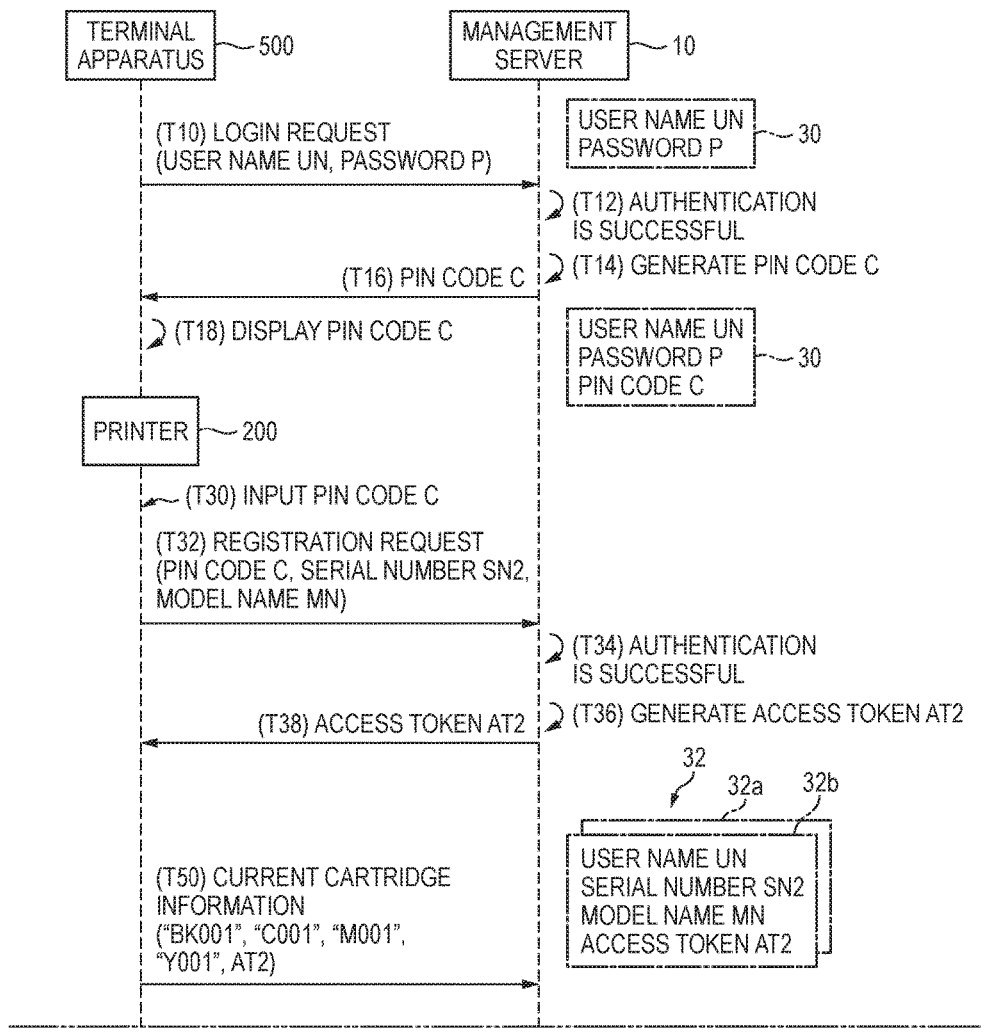
FIG. 2 depicts each table in a management server.

(Respective Tables 30 to 38 in Management Server 10; FIG. 2)

Subsequently, contents of the respective tables 30 to 38 in the management server 10 are described with reference to FIG. 2. In the user table 30, one or more user information is registered (i.e., stored). Each user information includes a user name (for example, UN) for identifying a user, and a password (for example, P) for authenticating the user. Each user information can be associated with a PIN (abbreviation of Personal Identification Number) code. The PIN code is used when registering device information related to the printer in the management server 10.

In the device table 32, one or more device information is registered. Each device information is associated with the user name, and includes a serial number, a model name and an access token. For example, the device information 32a includes the serial number SN1 of the printer 100, the model name MN, and an access token AT1. The access token AT1 is authentication information for authenticating the printer 100.

In the target cartridge table 34, a list of cartridges, which are targets of the shipment service to be provided by the management server 10, is stored. In the target cartridge table 34, for each of the plurality of models of printers, a model name of the corresponding printer and a cartridge name of each cartridge, which can be mounted to the printer, are stored with being associated with each other. For example, the respective BK cartridge names associated with the model name MN include "BK001", "BK010" and "BK100". Here, the cartridge name "BK000" (i.e., the small-capacity cartridge) that can be adopted as the BK cartridge 204 of FIG. 1 is not associated with the model name MN. That is, the BK cartridge having the cartridge name "BK000" is a non-target cartridge of the shipment service. Meanwhile, in the target cartridge table 34, each cartridge name corresponding to each color other than black is also stored.

In the mounted cartridge table 36, one or more mounted cartridge information is registered. Each mounted cartridge information is information related to the cartridge mounted to the printer. For example, the mounted cartridge information 36a includes the serial number SN1 of the printer 100, the cartridge name "BK001" of the BK cartridge mounted to the printer 100, and a non-target flag "OFF" associated with the cartridge name "BK001". For the non-target flag, any one value of "ON" indicating that the cartridge currently mounted to the printer is not a target of the shipment service and "OFF" indicating that the cartridge is not a non-target of the shipment service (i.e., is a target of the shipment service) is set. In the meantime, each mounted cartridge information further includes each cartridge name and each non-target flag corresponding to each color other than black.

In the shipment cartridge table 38, one or more shipment cartridge information is registered. Each shipment cartridge information is information related to a cartridge that is to be shipped to the user. For example, the shipment cartridge information 38a includes the serial number SN1 of the printer 100, a use flag, and the cartridge name "BK001" of the BK cartridge that is to be shipped to the user of the printer 100. For the use flag, any one value of "ON" indicating that the shipment service is to be used and "OFF" indicating that the shipment service is not to be used is set. The value "OFF" is set for the use flag, in an initial state. In the meantime, each shipment cartridge information further includes each cartridge name corresponding to each color other than black.

The management server 10 is configured to provide the shipment service by using the shipment cartridge information in the shipment cartridge table 38. Specifically, when the predetermined condition is satisfied, the management server 10 specifies an address, at which a printer identified by the serial number in the shipment cartridge table 38 is provided, on the basis of the address information 40. Then, the management server 10 provides the shipment service by executing processing (for example, notification to an operator who is to shipment a cartridge) for shipping a cartridge having a cartridge name included in the shipment cartridge information to the specified address.

(Processing for Registering Device Information; FIGS. 3A and 3B)

Processing for newly registering the device information related to the printer 200 is described with reference to FIGS. 3A and 3B. Meanwhile, in the below, regarding the processing that is to be executed by the CPU 22 of the management server 10, the management server 10 other than the CPU 22 is described as a subject of the processing for easy understanding. Also, all communications that are to be performed by the management server 10 are performed via the network I/F 12. Accordingly, the description "the network I/F 12" is omitted.

When the terminal apparatus 500 receives an operation of designating a URL of the management server 10 and an input operation of a user name UN and a password P from the user, the terminal apparatus 500 transmits a login request including the user name UN and the password P to the management server 10, in T10.

When the management server 10 receives the login request from the terminal apparatus 500, in T10, the management server 10 determines in T20 that authentication is successful, because a combination of the user name UN and the password P included in the login request has been registered in the user table 30. As a result, the terminal apparatus 500 logs in the management server 10. In this case, in T14, the management server 10 generates a PIN code C and stores the PIN code C in the user table 30 in association with the user name UN and the password P. Then, in T16, the management server 10 transmits the PIN code C to the terminal apparatus 500.

When the terminal apparatus 500 receives the PIN code C from the management server 10, in T16, the terminal apparatus 500 displays the PIN code C, in T18. The user can know the PIN code C, and inputs the PIN code C to the printer 200, in T30.

When the printer 200 receives the input of the PIN code C in T30, the printer 200 transmits, to the management server 10, a registration request for requesting the management server 10 to register the device information in T32. The registration request includes the PIN code C, and the serial number SN2 and the model name MN of the printer 200.

When the management server 10 receives the registration request from the printer 200 in T32, the management server 10 determines that authentication of the PIN code is successful in T34, because the PIN code C included in the registration request has been stored in the user table 30. In this case, the management server 10 specifies the user name UN (refer to T14) associated with the PIN code C from the user table 30. Then, in T36, the management server 10 generates an access token AT2, and associates and stores the specified user name UN, the serial number SN2 included in the registration request, the model name MN included in the registration request and the generated access token AT2 in the device table 32. Thereby, device information 32b of the printer 200 is registered in the management server 10. Then, in T38, the management server 10 transmits the access token AT2 to the printer 200.

When the printer 200 receives the access token AT2 from the management server 300 in T38, the printer 200 transmits current cartridge information to the management server 10 in T50. The current cartridge information includes the cartridge name (for example, the cartridge name "BK001" of the BK cartridge 202) of the cartridge of each color currently mounted to the printing execution unit 210, and the access token AT2.

When the management server 10 receives the current cartridge information from the printer 200 in T50, the management server 10 specifies the serial number SN2 and model name MN associated with the access token AT2 included in the current cartridge information, from the device information 32b registered in T36, in T60. Then, the management server 10 receives the list of the cartridge names of respective colors associated with the specified model name MN, from the target cartridge table 34. Then, the management server 10 determines whether each cartridge name included in the current cartridge information is included in the received list. In this example, since each cartridge name included in the current cartridge information is included in the received list, the management server 10 registers mounted cartridge information 36b in the mounted cartridge table 36, and registers shipment cartridge information 38b in the shipment cartridge table 38 in T62.

The mounted cartridge information 36b includes the specified serial number SN2, each cartridge name included in the received current cartridge information, and each non-target flag. At this point of time, the management server 10 sets "OFF" for each non-target flag. The reason is that each cartridge name included in the current cartridge information of T50 is included in the received list and each cartridge is not the non-target of the shipment service. On the other hand, in a case where the cartridge name of the specific color (for example, cyan) included in the current cartridge information is not included in the received list, the management server 10 registers the mounted cartridge information 36b including empty information as the cartridge name of the specific color and the non-target flag "ON" of the specific color.

The shipment cartridge information 38b includes the specified serial number SN2 and the use flag "OFF". At this point of time, each cartridge name (i.e., each cartridge name to be shipped to the user) in the shipment cartridge information 38b is empty information.

Figure 4:
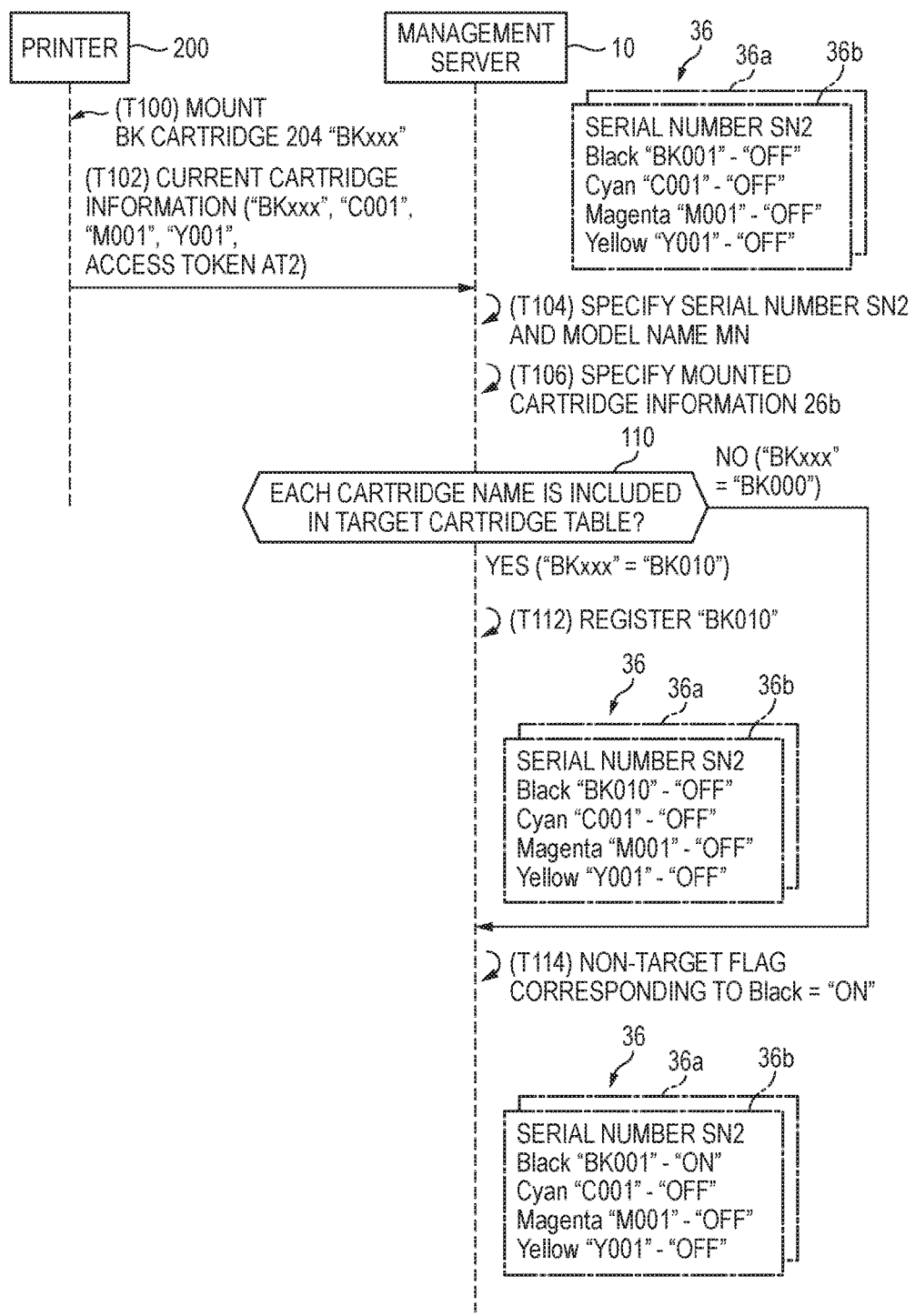
FIG. 4 depicts a sequence diagram of processing that is executed in a case where a new cartridge is mounted.

(Processing to be Executed in Case where New Cartridge is Mounted; FIG. 4)

Processing that is to be executed in a case where a new BK cartridge 204 is mounted to the printer 200 after the processing of FIGS. 3A and 3B, as shown in FIG. 1, is described with reference to FIG. 4.

In T100, the user mounts a new BK cartridge 204 to the printing execution unit 210 of the printer 200, instead of the BK cartridge 202. At this time, the printing execution unit 210 reads out the cartridge name "BKxxx" (i.e., "BK010" or "BK000") from the memory 204a of the BK cartridge 204, so that the printer 200 receives the cartridge name "BKxxx".

When the printer 200 receives the cartridge name "BKxxx" from the BK cartridge 204, the printer 200 transmits the current cartridge information including the cartridge name "BKxxx" to the management server 10 in T102. The current cartridge information further includes other cartridge names currently mounted to the printing execution unit 210, and the access token AT2.

When the management server 10 receives the current cartridge information from the printer 200 in T102, the management server 10 specifies the serial number SN2 and model name MN associated with the access token AT2 included in the current cartridge information, from the device information 32b (refer to T36, in FIG. 3A) of the device table 32, in T104. Then, the management server 10 specifies the mounted cartridge information 36b (refer to T62, in FIG. 3B) including the specified serial number SN2 from the mounted cartridge table 36 in T106.

Then, in T110, the management server 10 receives the list of the cartridge names of respective colors associated with the specified model name MN, from the target cartridge table 34. Then, the management server 10 determines whether the cartridge name of each color included in the current cartridge information is included in the received list. For example, in a case where the cartridge name "BKxxx" is the cartridge name "BK010", the management server 10 determines that each cartridge name including the cartridge name "BK010" is included in the received list (YES in T110), and executes processing of T112.

In T112, the management server 10 changes the black cartridge name "BK001" in the mounted cartridge information 36b specified in T106 to a cartridge name "BK010". Here, the non-target flag corresponding to the black cartridge name (i.e., the cartridge name "BK010") is kept at the value "OFF".

Also, for example, in a case where the cartridge name "BKxxx" is the cartridge name "BK000", the management server 10 determines that the cartridge name "BK000" is not included in the received list (NO in T110), and executes processing of T114.

In T114, the management server 10 changes the non-target flag corresponding to the black cartridge name "BK001" in the mounted cartridge information 36b specified in T106 from "OFF" to "ON". Here, the black cartridge name "BK001" in the mounted cartridge information 36b is not changed to "BK000". That is, in the mounted cartridge information 36b, the cartridge name "BK001" (i.e., the cartridge name "BK001" mounted to the printer 200 in the past), which is not currently mounted to the printer 200, is kept.

Figure 5:
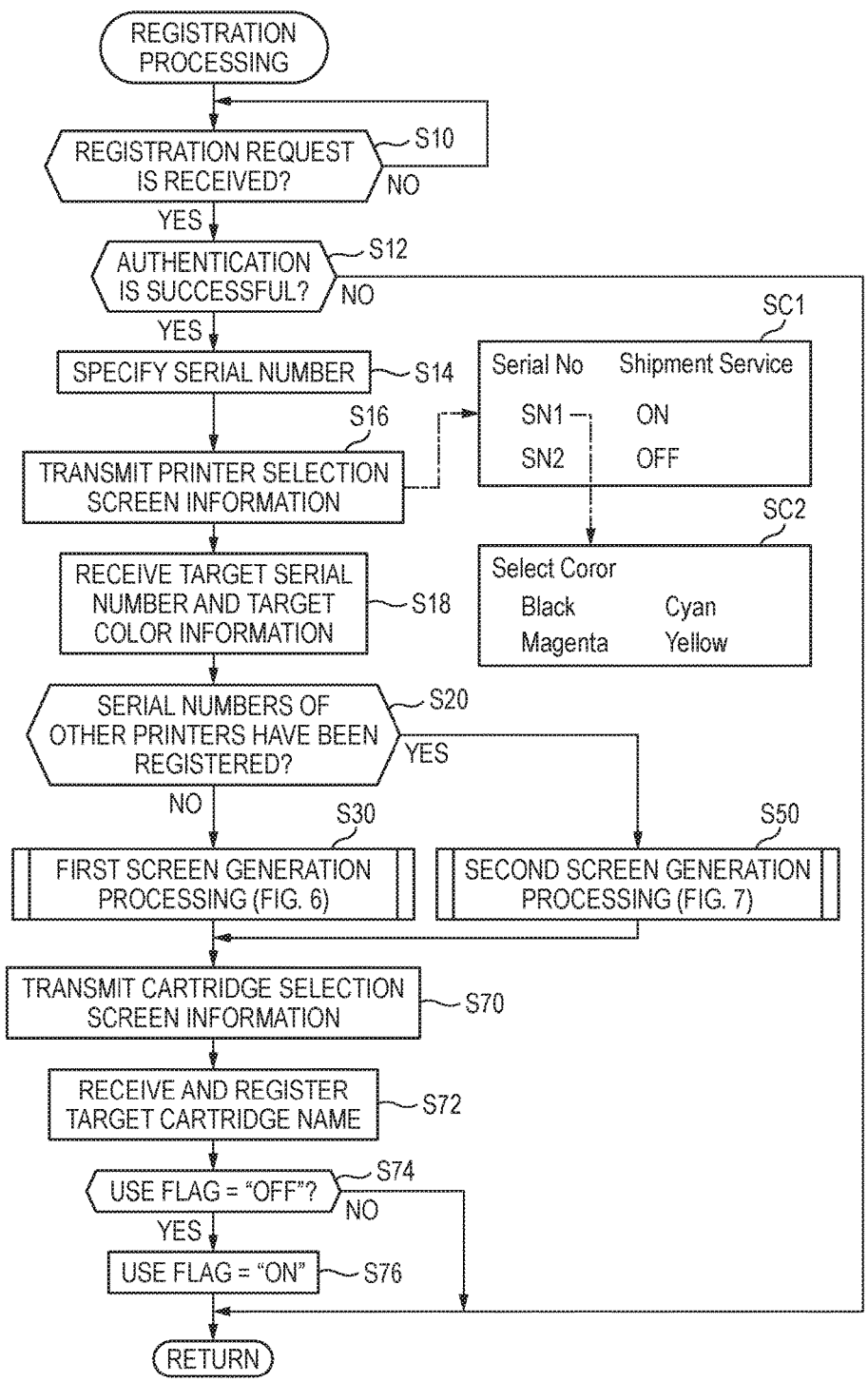
FIG. 5 depicts a flowchart of registration processing.

(Registration Processing; FIG. 5)

Registration processing that is to be executed by the CPU 22 of the management server 10 is described with reference to FIG. 5. The registration processing is processing for registering the cartridge name in the shipment cartridge table 38, and starts when a power supply of the management server 10 becomes on.

In S10, the CPU 22 monitors whether a registration request for registering the cartridge name in the shipment cartridge table 38 is received from the terminal apparatus 500. The registration request includes the user name and the password. In a case where the CPU 22 receives the registration request from the terminal apparatus 500, the CPU 22 determines YES in S10, and proceeds to S12.

In S12, the CPU 22 authenticates the user name and the password included in the registration request. In a case where a combination of authenticates the user name and the password included in the registration request has been registered in the user table 30, the CPU 22 determines that the authentication is successful (YES in S12), and proceeds to S14. On the other hand, in a case where the combination has not been registered in the user table 30, the CPU 22 determines that the authentication fails (NO in S12), skips over processing of S14 and thereafter, and ends the processing of FIG. 5.

In S14, the CPU 22 specifies one or more serial numbers associated with the user name included in the registration request, from the device table 32. Also, the CPU 22 specifies a value of the use flag associated with the serial number from the shipment cartridge table 38, for each of the one or more specified serial numbers.

In S16, the CPU 22 generates printer selection screen information, and transmits the information to the terminal apparatus 500. The printer selection screen information is information for enabling the terminal apparatus 500 to display a printer selection screen SC1 and a color selection screen SC2. The printer selection screen SC1 includes the respective serial numbers (for example, SN1, SN2) and the values of the respective use flags (for example, ON, OFF) specified in S14. Also, the color selection screen SC2 is a screen that is displayed in a case where one serial number in the printer selection screen SC1 is selected, and includes a list of multiple colors. The user of the terminal apparatus 500 selects one serial number (hereinafter, referred to as "target serial number") from the printer selection screen SC1 and one color (hereinafter, referred to as "target color") from the color selection screen SC2 so as to select the printer, for which the shipment service is to be provided, and a color of the cartridge. In this case, in S18, the CPU 22 receives the target serial number and target color information indicative of the target color, from the terminal apparatus 500.

In S20, the CPU 22 determines whether a serial number of another printer other than the printer, which is identified by the target serial number, has been registered in association with the user name included in the registration request received in S10. Specifically, the CPU 22 determines whether two or more serial numbers are specified in S14. In a case where it is determined that only one serial number has been specified in S14 (NO in S20), the CPU 22 executes first screen generation processing (refer to FIG. 6; which will be described later), in S30. On the other hand, in a case where it is determined that two or more serial numbers have been specified in S14 (YES in S20), the CPU 22 executes second screen generation processing (refer to FIG. 7; which will be described later), in S50. When the processing of S30 or S50 is over, processing of S70 is executed.

In S70, the CPU 22 transmits cartridge selection screen information generated in S30 or S50 to the terminal apparatus 500. Thereby, the terminal apparatus 500 displays a cartridge selection screen shown by the cartridge selection screen information. The user of the terminal apparatus 500 selects, from a plurality of cartridge names included in the cartridge selection screen, a cartridge name of a cartridge, for which the shipment service is to be provided, i.e., a cartridge name (hereinafter, referred to as "target cartridge name") of a cartridge that the user wants to order.

In S72, the CPU 22 receives the target cartridge name from the terminal apparatus 500, and registers the received target cartridge name in the shipment cartridge table 38 in association with the target serial number.

Then, in S74, the CPU 22 determines whether the use flag associated with the target serial number is "OFF". In case where it is determined that the use flag associated with the target serial number is "OFF" (YES in S74), the CPU 22 changes the use flag from "OFF" to "ON", in S76. Thereby, a situation is changed from a situation where the shipment service is not provided for the printer identified by the target serial number to a situation where the shipment service is provided. When the processing of S76 is over, the CPU 22 returns to S10. On the other hand, in a case where it is determined that the use flag associated with the target serial number is "ON" (NO in S74), the CPU 22 skips over S76 and returns to S10.

Figure 6:
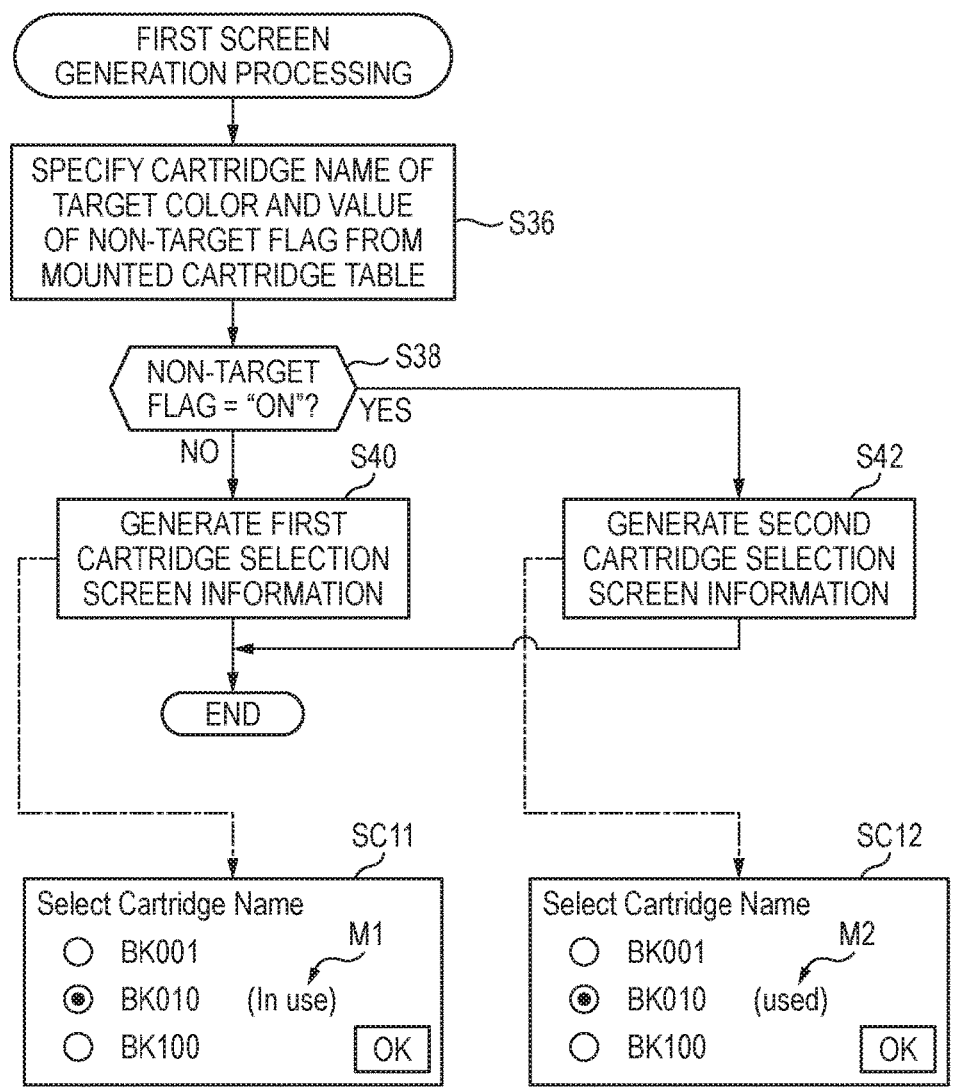
FIG. 6 depicts a flowchart of first screen generation processing.

(First Screen Generation Processing; FIG. 6)

The first screen generation processing of S30 of FIG. 5 is described with reference to FIG. 6. In S36, the CPU 22 specifies, from the mounted cartridge table 36, a cartridge name (hereinafter, referred to as "mounted cartridge name") of the target color associated with the target serial number and a value of the non-target flag of the target color.

In S38, the CPU 22 determines whether a value of the specified non-target flag is "ON". In a case where it is determined that the value of the non-target flag is "OFF" (NO in S38), i.e., in a case where the cartridge (i.e., the cartridge specified by the mounted cartridge name) currently mounted to the printer indicated by the target serial number is a target of the shipment service, the CPU 22 proceeds to S40.

In S40, the CPU 22 generates first cartridge selection screen information for showing a first cartridge selection screen SC11. First, the CPU 22 specifies, from the device table 32, the model name associated with the target serial number, and then receives, from the target cartridge table 34, the list of the cartridge names of the target color associated with the specified model name. The CPU 22 generates first cartridge selection screen information including the received list. The first cartridge selection screen SC11 includes a check box for selecting each cartridge name in the received list. Particularly, in the first cartridge selection screen SC11, the mounted cartridge name (for example, "BK010") specified in S36 and a message M1 (for example, "In Use") are aligned in line. That is, the mounted cartridge name and the message M1 are associated with each other. On the other hand, in a modified embodiment, the message M1 may be arranged at a right upper part of the mounted cartridge name. The message M1 indicates that the cartridge indicated by the mounted cartridge name is currently mounted to the printer. Meanwhile, in the first cartridge selection screen SC11, each cartridge name (for example, "BK001", "BK100") different from the mounted cartridge name is not associated with the message M1. When the processing of S40 is over, the processing of FIG. 6 is over.

Also, in a case where it is determined in S38 that the value of the non-target flag is "ON" (YES in S38), i.e., in a case where the cartridge currently mounted to the printer indicated by the target serial number is a non-target of the shipment service, the CPU 22 proceeds to S42.

In S42, the CPU 22 generates second cartridge selection screen information for showing a second cartridge selection screen SC12. Like S40, the CPU 22 receives the list of the cartridge names and generates second cartridge selection screen information including the received list. The second cartridge selection screen SC12 is similar to the first cartridge selection screen SC11, except that the mounted cartridge name (for example, "BK010") and a message M2 (for example, "Used") are associated with each other. The message M2 indicates that the cartridge indicated by the mounted cartridge name had been mounted to the printer in the past. In other words, the message M2 indicates that the cartridge indicated by the mounted cartridge name is not currently mounted to the printer. That is, the message M2 indicates that a cartridge, which is a non-target of the shipment service, is currently mounted to the printer. When the processing of S50 is over, the processing of FIG. 6 is over.

Figure 7:
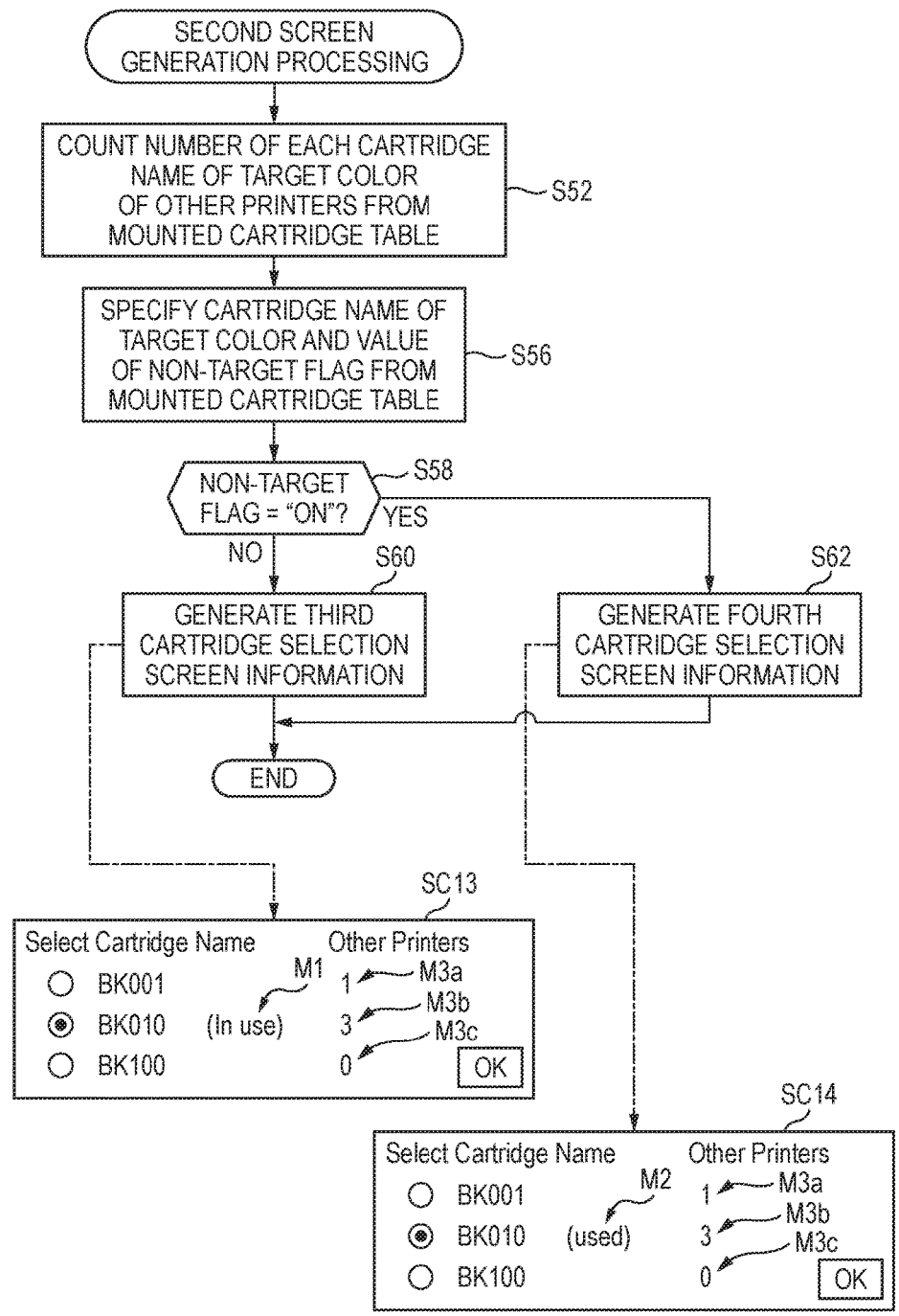
FIG. 7 depicts a flowchart of second screen generation processing.

(Second Screen Generation Processing; FIG. 7)

The second screen generation processing of S50 of FIG. 5 is described with reference to FIG. 7. In S52, the CPU 22 counts a number of each cartridge name of the target color in the other serial numbers other than the target serial number of the two or more serial numbers specified in S14 of FIG. 5, from the mounted cartridge table 36. Here, the number of the respective cartridge names indicates the number of printers to which the cartridge was mounted in the past.

For example, a situation is assumed in which the four serial numbers other than the target serial number are registered in the device table 32, in association with the user name included in the registration request of T10 of FIG. 5. Also, a situation is assumed in which the four serial numbers are respectively associated with "BK001", "BK010", "BK010" and "BK010" in the mounted cartridge table 36. In this case, in S52, the CPU 22 counts "1", "3" and "0", as the numbers of "BK001", "BK010" and "BK100".

The processing of S56 and S58 is similar to the processing of S36 and S38 of FIG. 6. In a case where it is determined that the value of the non-target flag is "OFF" (NO in S58), the CPU 22 generates third cartridge selection screen information for showing a third cartridge selection screen SC13, in S60. The third cartridge selection screen SC13 is similar to the first cartridge selection screen SC11 of FIG. 6, except that it includes messages M3a to M3c. In the third cartridge selection screen SC13, in a line including each cartridge name of the list of the cartridge names of the target color, each of the messages M3a to M3c indicative of the number of printers to which the cartridge of the corresponding cartridge name was mounted in the past is displayed (for example, the cartridge name and the number of printers are aligned in line). The third cartridge selection screen SC13 is similar to the first cartridge selection screen SC11 of FIG. 6, except that it includes the messages M3a to M3c. Each of the messages M3a to M3c includes each number of each cartridge name counted in S52 (i.e., the number of the printers). When the processing of S60 is over, the processing of FIG. 7 is over.

Also, in a case where it is determined that the value of the non-target flag is "ON" (YES in S58), the CPU 22 generates fourth cartridge selection screen information for showing a fourth cartridge selection screen SC14, in S70. The fourth cartridge selection screen SC14 is similar to the second cartridge selection screen SC12 of FIG. 6, except that it includes messages M3a to M3c similar to the third cartridge selection screen SC13. When the processing of S70 is over, the processing of FIG. 7 is over.

Figure 8A:
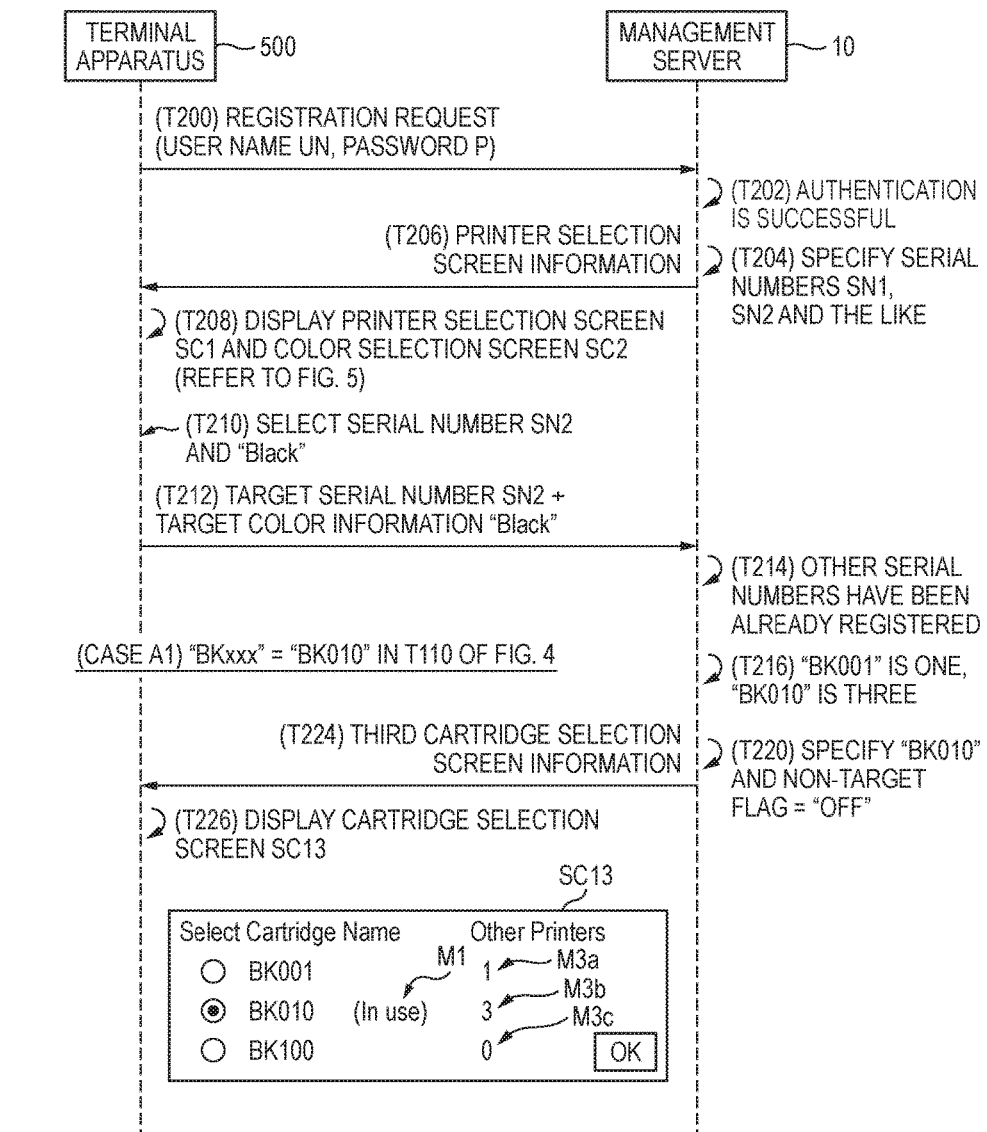
FIGS. 8A and 8B depicts a specific case that is implemented by the processing of FIG. 5.
Figure 8B:
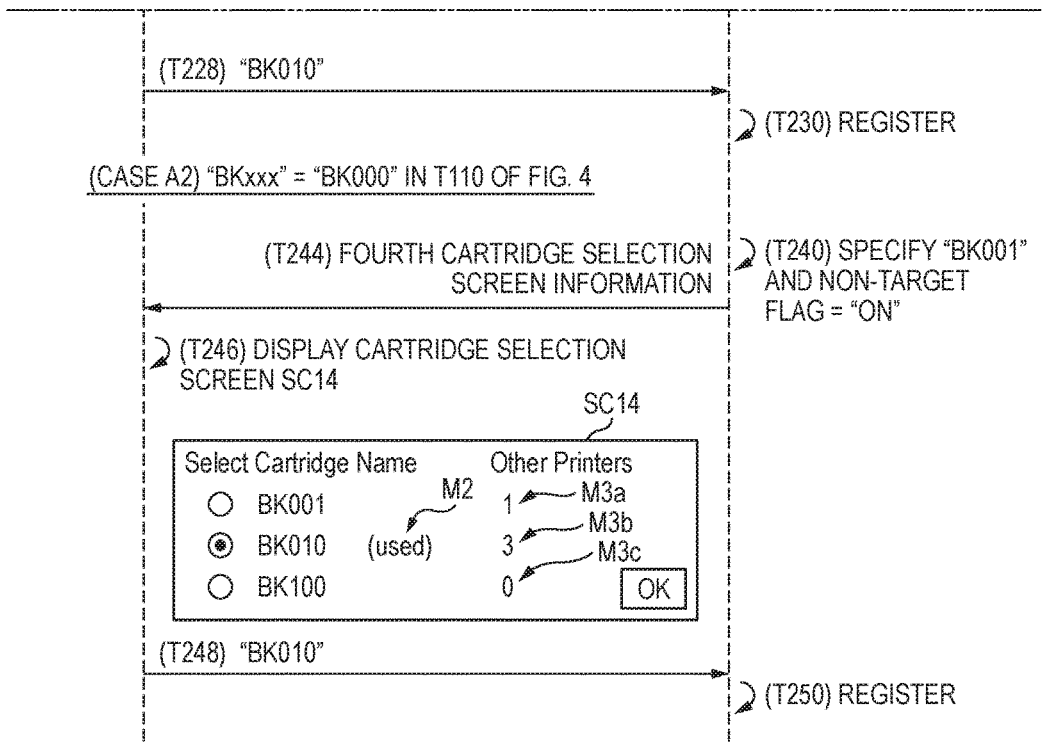

(Specific Case; FIGS. 8A and 8B)

A specific case that is to be implemented by the processing of FIG. 5 and effects of the illustrative embodiment are described with reference to FIGS. 8A and 8B. The specific case is a case after the user indicated by the user name UN performs the processing of FIGS. 3A and 3B for each of five printers including the printers 100, 200. In the specific case, the five device information including the device information 32a, 32b is registered in the device table 32, and each device information includes the user name UN. Also, in the specific case, the processing of FIG. 4 is performed for the printer 200. In the below, a case A1 where the cartridge name "BKxxx" is "BK010" and a case A2 where the cartridge name "BKxxx" is "BK000" are described.

When the management server 10 receives the registration request from the terminal apparatus 500 (YES in S10 of FIG. 5) in T200, the management server 10 determines that the authentication is successful in T202 (YES in S12) because the combination of the user name UN and the password P included in the registration request has been registered in the user table 30.

Continuously, the management server 10 specifies the five serial numbers including the serial numbers SN1, SN2 associated with the user name UN from the device table 32 in T204. Then, the management server 10 transmits, to the terminal apparatus 500, the printer selection screen information for enabling the terminal apparatus 500 to display the printer selection screen SC1 including the five serial numbers and the color selection screen SC2 in T206 (S16 in FIG. 5).

When the terminal apparatus 500 receives the printer selection screen information from the management server 10, in T206, the terminal apparatus 500 displays the printer selection screen SC1 and the color selection screen SC2 in T208. Thereby, the user selects the serial number SN2 of the printer 200 from the five serial numbers in the printer selection screen SC1 and selects black from multiple colors in the color selection screen SC2 in T210.

When the terminal apparatus 500 receives the selection of the serial number SN2 and black as the target serial number and the target color in T210, the terminal apparatus 500 transmits the target serial number SN2 and the target color information indicative of black to the management server 10 in T212.

When the management server 10 receives the target serial number SN2 and the target color information indicative of black from the terminal apparatus in T212 (S18 in FIG. 5), the management server 10 determines that the other serial numbers other than the target serial number SN2 have been registered in the management server 10 in T214 (YES in S20) because the five serial numbers have been specified in T204. Then, the management server 10 executes the second screen generation processing (S50). Here, in this specific case, in the mounted cartridge table 36, the serial number SN1 is associated with the cartridge name "BK001" for black. Also, the three serial numbers of the five serial numbers except the serial numbers SN1, SN2 are respectively associated with the cartridge name "BK010". For this reason, the management server 10 counts "1", "3" and "0", as the numbers of "BK001", "BK010" and "BK100", in T216.

(Case A1 Where Cartridge Name "BKxxx" is "BK010")

In Case A1, as the mounted cartridge information 36b including the serial number SN2, the cartridge name "BK010" of the BK cartridge 204 currently mounted to the printer 200 is registered. In T220, the management server 10 specifies, from the mounted cartridge table 36, the black cartridge name "BK010" associated with the target serial number SN2 and the black non-target flag "OFF" (S56 in FIG. 7).

Since the value of the black non-target flag is "OFF" (NO in S58 of FIG. 7), the management server 10 transmits the third cartridge selection screen information for showing the third cartridge selection screen SC13 to the terminal apparatus 500 in T224. Thereby, the terminal apparatus 500 displays the third cartridge selection screen SC13 in T226.

In Case A1, in the third cartridge selection screen SC13, the cartridge name "BK010" of the list of the black cartridge names and the message M1 (i.e., "In Use") are associated with each other. Also, in the third cartridge selection screen SC13, the respective cartridge names "BK001", "BK010" and "BK100" and the numbers "1", "3" and "0" (i.e., the respective messages M3a to M3c) of the other printers to which the BK cartridges having the cartridge names were mounted in the past are associated. Thereby, the user refers to the messages M1 and M3a to M3c and selects the cartridge name "BK010" from the list of the cartridge names in the third cartridge selection screen SC13.

When the terminal apparatus 500 receives the selection of the cartridge name "BK010", the terminal apparatus 500 transmits the selected cartridge name "BK010", in T228. Thereby, the management server 10 registers the cartridge name "BK010" received from the terminal apparatus 500 in the shipment cartridge table 38 in association with the target serial number SN2 in T230.

According to Case A1, the management server 10 enables the terminal apparatus 500 to display the third cartridge selection screen SC13 (T226). In the third cartridge selection screen SC13, the cartridge name "BK010" of the cartridge currently mounted to the printer 200 and the message M1 are associated with each other, and the message M1 is not associated with the lines of the other cartridge names "BK001", "BK100". For this reason, the user can distinguishingly recognize the cartridge name "BK010" and the other cartridge names "BK001", "BK100". Therefore, in a case where the user wants to place an order for the cartridge of the cartridge name "BK010" actually mounted to the printer 200, for example, the user can easily select the cartridge name "BK010". Also, for example, in a case where the user wants to place an order for the cartridge of the cartridge name other than the cartridge of the cartridge name "BK010", the user can easily select the cartridge name (for example, "BK001") other than the cartridge name "BK010". In this way, in a situation where the user is to register the cartridge name of the cartridge for which the shipment service is to be provided (i.e., the cartridge name of the cartridge that the user wants to order from the server), the user can easily select the cartridge name of the cartridge to be mounted to the printer 200, from the plurality of cartridge names.

Also, according to Case A1, in the third cartridge selection screen SC13, the message M1 is included only in the line including the cartridge name "BK010" currently mounted to the printer 200, and is not included in the lines including the other cartridge names (for example, the cartridge name "BK001" of the cartridge mounted to the printer 200 in the past). According to Case A1, as compared to a Comparative Example where the message related to the printer 200 is included in the line including the cartridge name "BK001" as well, the user can easily select the cartridge name of the cartridge currently mounted to the printer 200, from the plurality of cartridge names.

Also, according to Case A1, in the third cartridge selection screen SC13, each of the cartridge names and the number of the printers (i.e., the messages M3a to M3c) to which the cartridge of the corresponding cartridge name was mounted in the past are associated with each other. Thereby, the user can know situations of the other printers, such as a past record indicating that each cartridge having each cartridge name was mounted to other printers in the past, the number of other printers to which each cartridge was mounted in the past, and the like. The user can select one cartridge name from the plurality of cartridge names, considering the situations of the other printers other than the printer 200.

(Case A2 where Cartridge Name "BKxxx" is "BK000")

In Case A2, as the mounted cartridge information 36b including the serial number SN2, the cartridge name "BK001" of the BK cartridge 204 mounted to the printer 200 in the past is registered. In T240, the management server 10 specifies, from the mounted cartridge table 36, the black cartridge name "BK001" associated with the target serial number SN2 and the black non-target flag "ON" (S56 in FIG. 7).

Since the value of the black non-target flag is "ON" (YES in S58 of FIG. 7), the management server 10 transmits the fourth cartridge selection screen information for showing the fourth cartridge selection screen SC14 to the terminal apparatus 500, in T244. Thereby, the terminal apparatus 500 displays the fourth cartridge selection screen SC14, in T246.

In Case A2, in the fourth cartridge selection screen SC14, the cartridge name "BK001" of the list of the black cartridge names and the message M2 (i.e., "Used") are associated with each other. Also, in the fourth cartridge selection screen SC14, the respective cartridge names "BK001", "BK010" and "BK100" and the numbers "1", "3" and "0" (i.e., the respective messages M3a to M3c) of other printers to which the BK cartridges having the cartridge names were mounted in the past are associated. Thereby, the user refers to the messages M2 and M3a to M3c and selects the cartridge name "BK010" from the list of the cartridge names in the fourth cartridge selection screen SC14. T248 and T250 are similar to T228 and T230.

According to Case A2, the management server 10 enables the terminal apparatus 500 to display the fourth cartridge selection screen SC14 (T246). In the fourth cartridge selection screen SC14, the cartridge name "BK001" of the cartridge mounted to the printer 200 in the past and the message M2 are associated with each other. For this reason, the user can know that the cartridge of the cartridge name "BK001" had been mounted to the printer 200 in the past. Therefore, the user can select the cartridge name of the cartridge, which is to be mounted to the printer 200, from the list of the cartridge names in the fourth cartridge selection screen SC14, considering the above situation.

In the below, effects other than the above-described effects is described. According to the above configuration, the controller 20 (i.e., the CPU 22) of the management server 10 executes the processing of FIG. 5. Instead of this configuration, a Comparative Example is considered in which the communication system 2 does not include the management server 10, each of the plurality of printers in the communication system 2 includes the target cartridge table 34, the mounted cartridge information of the printer, and the memory in which the shipment cartridge information of the printer is stored, and a controller (hereinafter, referred to as "printer controller") of the printer 100 executes the processing of FIG. 5. In this Comparative Example, the processing from S10 to S20 is omitted, and the printer controller displays the color selection screen SC2 on a display of the printer, and executes the processing of S30 after receiving the selection of the target color from the user. Then, the printer controller displays the cartridge selection screen (SC11 or SC12) shown by the cartridge selection screen information generated in S30 on the display of the printer, instead of S70 and S72. Then, when the printer controller receives a selection of the cartridge name of the cartridge, for which the shipment service is to be provided, from the user, the printer controller registers the selected cartridge name in the memory of the printer, as the shipment cartridge information. In general, since the memory capacity of the printer is smaller, as compared to the management server 10, it is necessary to increase the memory capacity of the printer so as to implement the configuration of Comparative Example. In contrast, according to the illustrative embodiment, since each of the tables 34, 36, 38 is stored in the memory of the management server 10 and the processing of FIG. 5 is implemented in the management server 10, it is not necessary to increase the memory capacity of the printer. On the other hand, in a modified embodiment, the configuration of Comparative Example may be adopted. In this modified embodiment, the printer controller is an example of "controller".

(Correspondence Relation)

The controller 20 of the management server 10 and the printing execution unit 210 of the printer 200 are examples of "the controller" and "the printing execution apparatus", respectively. The processing of receiving the target serial number in S18 of FIG. 5 is an example of "the registering instruction". The cartridge names "BK001", "BK010" and "BK100" are examples of "the plurality of pieces of type information". The displaying of the message M1 and the non-displaying of the message M1 are examples of "the first display mode" and "the second display mode", respectively. Each cartridge name in the shipment cartridge table 38 is an example of "the ordering-related information".

In a case where the BK cartridge 204 having the cartridge name "BK010" is mounted in T100 of FIG. 4, the BK cartridge 204 and "BK010" are examples of "the first type consumable product" and "the first type consumable product information", respectively. The cartridge name "BK010" in the third cartridge selection screen SC13 of FIG. 8A is an example of "the first type information". The BK cartridge 202 and the cartridge name "BK001" in FIG. 1 are examples of "the second type consumable product" and "the second type consumable product information", respectively. The cartridge selection screen SC11 or SC13 and the message M1 are examples of "the first type selection screen" and "the first character string", respectively.

In a case where the BK cartridge 204 having the cartridge name "BK000" is mounted in T100 of FIG. 4, the BK cartridge 202 and "BK001" of FIG. 1 are examples of "the first type consumable product" and "the first type consumable product information", respectively. The cartridge name "BK001" in the fourth cartridge selection screen SC14 of FIG. 8B is an example of "the first type information". The BK cartridge 204 having the cartridge name "BK000" and the cartridge name "BK000" are examples of "the specific consumable product" and "the specific consumable product information", respectively. The cartridge selection screen SC12 or SC14 and the message M2 are examples of "the second type selection screen" and "the second character string", respectively.

The printing execution unit 110 of the printer 100, the cartridge selection screen SC13 or SC14 and the message M3a (or M3b) are examples of "one or more other printing execution apparatuses", "the third type selection screen" and "the predetermined image", respectively. The network I/F 12, the terminal apparatus 500 and the serial number SN2 are examples of "the communication interface", "the external apparatus" and "the identification information", respectively.

Figure 3:
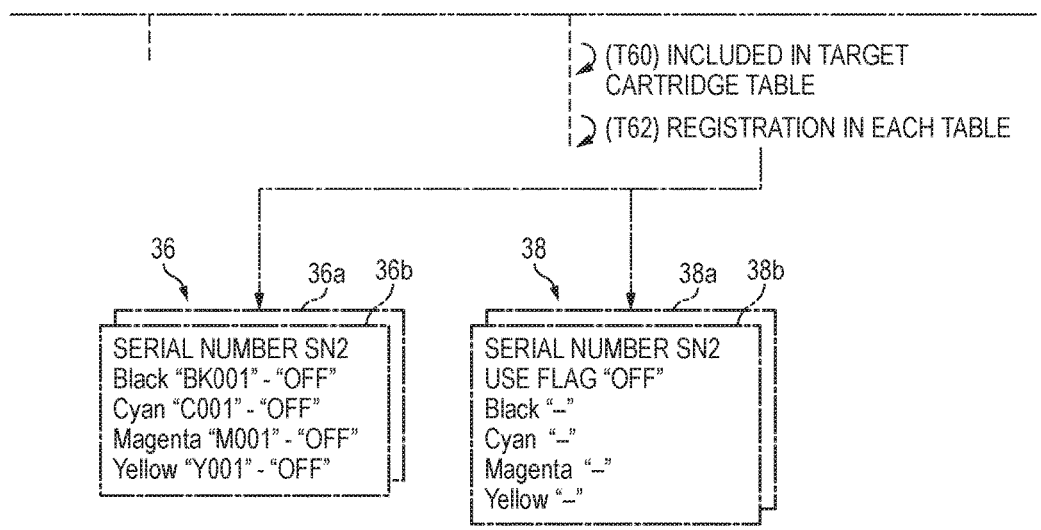
FIGS. 3A and 3B depict a sequence diagram of processing for registering device information.

T102 of FIG. 4, S30 or S50 and S72 of FIG. 5 are examples of "the receiving of the first type consumable product information", "the displaying of the selection screen" and "the registering of the ordering-related information", respectively. T50 of FIG. 3A is an example of "the receiving of the second type consumable product information". T102 that is executed in a case where the BK cartridge 204 having the cartridge name "BK000" is mounted in T100 of FIG. 4 is an example of "the receiving of the specific consumable product information". T50 of FIG. 3 that is executed for the printer 100 is an example of "the receiving of the consumable product information". S18 of FIG. 5 is an example of "the receiving of the registering instruction".

Although the specific example of the present disclosure has been described in detail, the example is just exemplary and does not limit the claims. The technology defined in the claims includes diverse changes and modifications of the specific example. Modified embodiments of the illustrative embodiment are described.

(Modified Embodiment 1)

According to the illustrative embodiment, the printer 200 receives the cartridge name "BK010" of the BK cartridge 204 from the printing execution unit 210 to which the BK cartridge 204 is mounted (T100 in FIG. 4). Then, the management server 10 receives the current cartridge information including the cartridge name "BK010" from the printer 200 (T102 in FIG. 4). Instead of this configuration, the printer 200 may be configured to receive a code (for example, a serial number, a manufacturing number, a model number and the like) for identifying the BK cartridge 204 from the printing execution unit 210 to which the BK cartridge 204 is mounted. The management server 10 may be configured to receive the code from the printer 200. In this case, the management server 10 may be configured to receive the cartridge name "BK010" of the BK cartridge 204, based on the received code. In the Modified Embodiment 1, the code is an example of "the first consumable product information".

(Modified Embodiment 2)

According to the illustrative embodiment, the cartridge selection screen SC11 includes the message M1 (i.e., "In Use"). Instead of this configuration, the mounted cartridge name (for example, "BK010") may be displayed with a first size, and the other cartridge name may be displayed with a second size smaller than the first size. Also, the mounted cartridge name (for example, "BK010") may have a first color, and the other cartridge name may have a second color different from the first color. Also, only the mounted cartridge name may be surrounded by a predetermined frame. In the Modified Embodiment 2, the display by the first size, the provision of the first color and the surrounding by the predetermined frame are examples of "the first display mode". Also, the display by the second size, the provision of the second color and the non-surrounding by the predetermined frame are examples of "the second display mode".

(Modified Embodiment 3)

According to the illustrative embodiment, the processing of FIG. 5 is implemented by the controller 20 of the management server 10. Instead of this configuration, the processing of FIG. 5 may be implemented by cooperation of the controller 20 of the management server 10 with the printer controller. In this case, a part of the processing of FIG. 5, for example, the processing of S70 to S76 may be implemented by the printer controller. That is, the cartridge selection screen may be displayed on the display of the printer, and in a case where one cartridge name is selected from the plurality of cartridge names included in the cartridge selection screen, the printer controller may register the one cartridge name in the shipment cartridge table in the memory of the printer. Also, as described above, the processing of FIG. 5 may be implemented only by the printer controller. According to the Modified Embodiment 3, at least one of "the receiving of the first type consumable product information", "the displaying of the selection screen" and "the registering of the ordering-related information" may be implemented by the printer controller, not the controller of the management server 10. In the Modified Embodiment 3, the controller 20 of the management server 10 and the printer controller are examples of "the controller".

(Modified Embodiment 4)

The management server 10 may be configured not to execute the processing of S38 and S42 of FIG. 6 and S58 and S62 of FIG. 7. In the Modified Embodiment 4, the processing of displaying "the second type selection screen" can be omitted.

(Modified Embodiment 5)

As described above, as a modified embodiment, the printer controller may be configured to execute the processing of FIG. 5. In this case, the printer controller may be configured to transmit a cartridge name request to one or more other printers belonging to the same LAN, through the LAN to which the printer having the printer controller belongs, thereby receiving the cartridge names of the cartridges currently mounted to the other printers from the other printers. Then, the printer controller may be configured to execute the second screen generation processing (FIG. 7) by using the received one or more cartridge names, thereby generating the third or fourth cartridge selection screen information. In the Modified Embodiment 5, the printer controller is an example of "the controller", and the printer controller may "receive the consumable product information".

(Modified Embodiment 6)

In the illustrative embodiment, the third cartridge selection screen SC13 includes the respective messages M3a to M3c. Instead of this configuration, in the third cartridge selection screen SC13, each of at least one in the list of the cartridge names of the target color may be associated with an image including a predetermined symbol, a figure and the like indicating that the cartridge of the corresponding cartridge name is mounted to the other printers. In the Modified Embodiment 6, the image including a predetermined symbol, a figure and the like is an example of "the predetermined image".

(Modified Embodiment 7)

The management server 10 may be configured not to execute the processing of S20 and S50 of FIG. 5. In the Modified Embodiment 7, the processing of displaying "the third type selection screen" can be omitted.

(Modified Embodiment 8)

In the illustrative embodiment, the CPU 22 receives the registration request including the user name and the password from the terminal apparatus 500, in S10. Instead of this configuration, the CPU 22 may be configured to receive the registration request including an access token from the terminal apparatus 500. Then, the CPU 22 may be configured to specify, as the target serial number, the serial number associated with the access token included in the registration request, from the device table 32, and to execute the processing of S36 of FIG. 6 or S56 of FIG. 7. In the Modified Embodiment 8, the access token is an example of "the identification information".

(Modified Embodiment 9)

In the illustrative embodiment, the management server 10 is configured to manage the information related to the plurality of printers. The management server 10 is configured to register one or more serial numbers in the device table 32, and to store the cartridge name of the cartridge mounted to the printer, in association with each serial number. Instead of this configuration, the management server 10 may be configured to manage only information related to one printer. The management server 10 may be configured not to store the device table 32, and to store only one mounted cartridge information not including the serial number. In this case, the management server 10 may transmit the screen information for displaying the color selection screen SC2 to the terminal apparatus 500, in S16, and receive only the target color information, in S18. In other words, in S18, the management server 10 may not receive the target serial number. In the Modified Embodiment 9, "the registering of the first type consumable product information" can be omitted.

(Modified Embodiment 10)

In the illustrative embodiment, the CPU 22 of the management server 10 executes the program 26 (i.e., software), thereby implementing the respective processing of FIGS. 3 to 5. Instead of this configuration, any one processing may be implemented by hardware such as a logical circuit.

Also, the technical elements described in the specification or drawings exhibit the technical usefulness individually or by a variety of combinations thereof and are not limited to the combinations defined in the claims at the time of filing the subject application. Also, the technology exemplified in the specification or drawings achieves a plurality of purposes at the same time, and the achievement of any one purpose has technical usefulness.

What is claimed is:

1. A controller configured to perform:
    receiving first type consumable product information from a first type consumable product in a state where the first type consumable product is mounted to a printing execution apparatus, the first type consumable product information specifying the first type consumable product;
    receiving a registering instruction, the registering instruction being for registering ordering-related information, the ordering-related information being related to an ordering of a consumable product to be mounted to the printing execution apparatus;
    displaying a selection screen on a display in a case where the registering instruction is received, the selection screen including a plurality of pieces of type information indicative of a plurality of types of consumable products capable of being mounted to the printing execution apparatus,
        the plurality of pieces of type information including a first type information and another type information,
        the first type information indicating the first type consumable product specified by the received first type consumable product information and being displayed in a first display mode in the selection screen, and
        the other type information indicating another consumable product different from the first type consumable product and being displayed in a second display mode different from the first display mode in the selection screen, the other consumable product currently not being mounted to the printing execution apparatus; and
    registering the ordering-related information in a memory in a case where one piece of type information is selected from the plurality of pieces of type information included in the selection screen, the registered ordering-related information including selected consumable product information specifying a selected consumable product, and the selected consumable product being indicated by the one piece of type information.

2. The controller according to claim 1, configured to further perform:
    receiving second type consumable product information from a second type consumable product in a state where the second type consumable product is mounted to the printing execution apparatus, the second type consumable product information specifying the second type consumable product, and the second type consumable product being one of the plurality of types of consumable products and being different from the first type consumable product,
    wherein the receiving of the first type consumable product information comprises receiving the first type consumable product information from the first type consumable product mounted to the printing execution apparatus, the first type consumable product being mounted to the printing execution apparatus instead of the second type consumable product after the second type consumable product information has been received,
    wherein the displaying comprises displaying the selection screen on the display in a case where the registering instruction is received after the second type consumable product information and the first type consumable product information have been received, and
    wherein the plurality of pieces of type information includes a second type information, the second type information indicating the second type consumable product specified by the received second type consumable product information and being displayed in the second display mode in the selection screen.

3. The controller according to claim 1,
    wherein the displaying comprises displaying a first type selection screen on the display in a case where the registering instruction is received in a state where the first type consumable product is mounted to the printing execution apparatus,
    wherein, in the first type selection screen,
        the first type information and a first character string are displayed in association with each other in the first display mode, the first character string indicating that the first type consumable product is currently mounted to the printing execution apparatus, and
        the other type information is displayed without being associated with the first character string in the second display mode.

4. The controller according to claim 1, configured to further perform:
    receiving specific consumable product information from a specific consumable product mounted to the printing execution apparatus, the specific consumable product being mounted to the printing execution apparatus instead of the first type consumable product after the first type consumable product information has been received, the specific consumable product information specifying the specific consumable product, and the specific consumable product not being included in the plurality of types of consumable products, wherein the displaying comprises displaying a second type selection screen on the display in a case where the registering instruction is received in a state where the specific consumable product is mounted to the printing execution apparatus after the first type consumable product information and the specific consumable product information have been received, wherein, in the second type selection screen,
the first type consumable product information and a second character string are displayed in association with each other in the first display mode, the second character string indicating that the first type consumable product had been mounted to the printing execution apparatus in the past, and
another consumable product information is displayed without being associated with the second character string in the second display mode.

5. The controller according to claim 1, configured to further perform:
receiving consumable product information from a consumable product mounted to each of one or more other printing execution apparatuses different from the printing execution apparatus, the consumable product information specifying the consumable product mounted to the each of one or more other printing execution apparatuses,
wherein the displaying comprises displaying a third type selection screen on the display in a case where the registering instruction is received after the first type consumable product information and one or more consumable product information have been received,
wherein the plurality of pieces of type information includes one or more pieces of type information, the one or more pieces of type information indicating one or more consumable products specified by the received one or more consumable product information,
wherein, in the third type selection screen, a predetermined image is associated with each of the one or more pieces of type information, and
wherein the predetermined image indicates that a consumable product indicated by one of the one or more pieces of type information associated with the predetermined image is mounted to another printing execution apparatus.

6. A server comprising:
the controller according to claim 1, and
a communication interface,
wherein the receiving of the first type consumable product information comprises receiving the first type consumable product information from the printing execution apparatus through the communication interface,
wherein the controller is configured to further perform:
receiving the registering instruction from an external apparatus through the communication interface after the first type consumable product information has been received, and
wherein the displaying comprises displaying the selection screen on the display of the external apparatus by transmitting selection screen information for showing the selection screen to the external apparatus in a case where the registering instruction is received.

7. The server according to claim 6, wherein the controller is further configured to perform:
registering the first type consumable product information in the memory in association with identification information identifying the printing execution apparatus in a case where the first type consumable product information is received from the printing execution apparatus, wherein the registering instruction comprises the identification information, wherein the displaying comprises specifying the first type consumable product information associated with the identification information from the memory, generating the selection screen information by using the specified first type consumable product information, and transmitting the generated selection screen information to the external apparatus, in a case where the registering instruction including the identification information is received, and wherein the registering of the ordering-related information comprises receiving the one piece of type information from the external apparatus, and registering the ordering-related information in the memory in association with the identification information, in a case where the one piece of type information is selected from the plurality of pieces of type information included in the selection screen, the ordering-related information including the selected consumable product information, the selected consumable product information specifying the selected consumable product indicated by the received one piece of type information, and the selected screen being shown by the generated selection screen information.

8. A non-transitory computer readable storage medium storing a program, when executed by a computer of a controller, causing the controller to perform:
receiving first type consumable product information from a first type consumable product in a state where the first type consumable product is mounted to a printing execution apparatus, the first type consumable product information specifying the first type consumable product;
receiving a registering instruction, the registering instruction being for registering ordering-related information, the ordering-related information being related to an ordering of a consumable product to be mounted to the printing execution apparatus;
displaying a selection screen on a display in a case where the registering instruction is received, the selection screen including a plurality of pieces of type information indicative of a plurality of types of consumable products capable of being mounted to the printing execution apparatus,
the plurality of pieces of type information including a first type information and another type information,
the first type information indicating the first type consumable product specified by the received first type consumable product information and being displayed in a first display mode in the selection screen, and
the other type information indicating another consumable product different from the first type consumable product and being displayed in a second display mode different from the first display mode in the selection screen, the other consumable product currently not being mounted to the printing execution apparatus; and
registering the ordering-related information in a memory in a case where one piece of type information is selected from the plurality of pieces of type information included in the selection screen, the registered ordering-related information including selected consumable product information specifying a selected consumable product, and the selected consumable product being indicated by the one piece of type information.

* * * * *